United States Patent

Roberts

[15] 3,638,863
[45] Feb. 1, 1972

[54] SPRINKLER UNIT
[72] Inventor: James C. Roberts, 1860 Jeffrey, Escondido, Calif. 92025
[22] Filed: Jan. 25, 1971
[21] Appl. No.: 109,374

[52] U.S. Cl. ............................................. 239/276, 248/87
[51] Int. Cl. ........................................................ A62c 31/22
[58] Field of Search ............... 239/DIG. 1, 271, 273, 275, 239/280, 521, 523, 601, 589, 276; 248/87

[56] References Cited

UNITED STATES PATENTS 2,480,989  9/1949  Weaver .......................... 239/276 X

FOREIGN PATENTS OR APPLICATIONS 874,454  8/1961  Great Britain .......................... 248/87
517,699  3/1955  Italy ...................................... 239/276

Primary Examiner—M. Henson Wood, Jr.
Assistant Examiner—Edwin D. Grant
Attorney—Carl R. Brown and Neil F. Martin

[57] ABSTRACT

A sprinkler unit comprising a one-piece peglike element, which is inserted in the ground at the desired location. The upper end of the unit has a plug that fits into a water supply hose and the plug has a restricted channel that directs a stream of water against a platform that is open at one side and has angled walls to direct the spray out over a controlled area.

5 Claims, 5 Drawing Figures

PATENTED FEB 1 1972 3,638,863
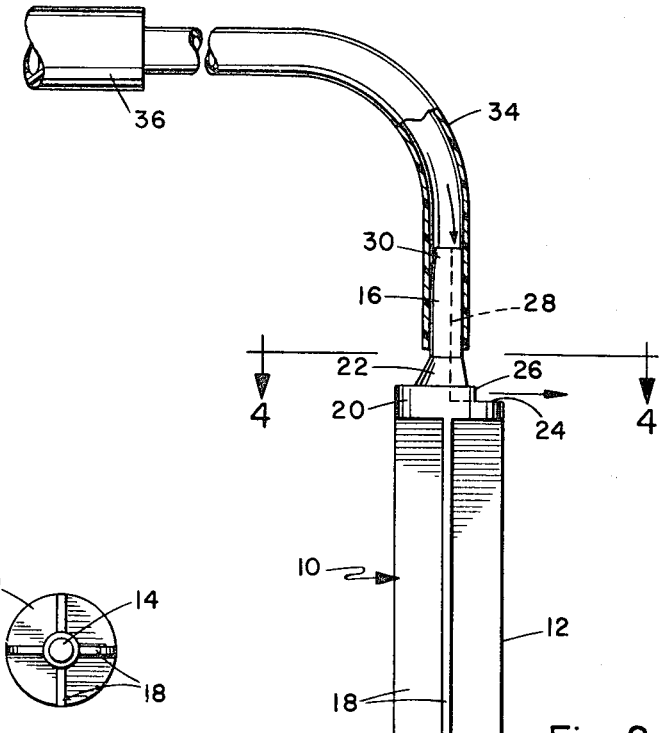
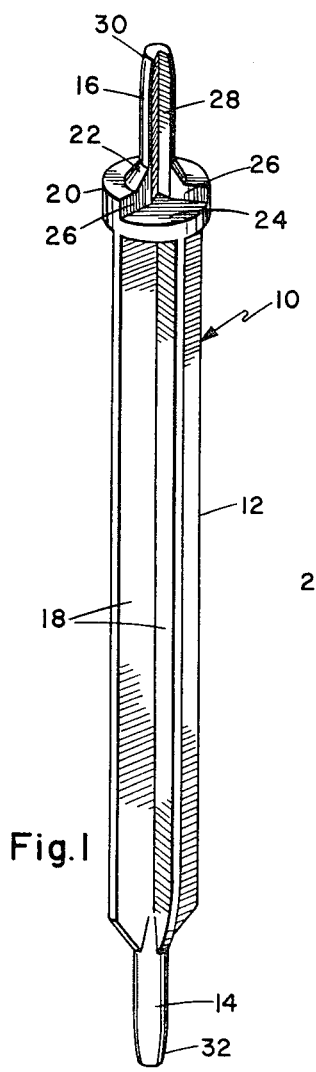
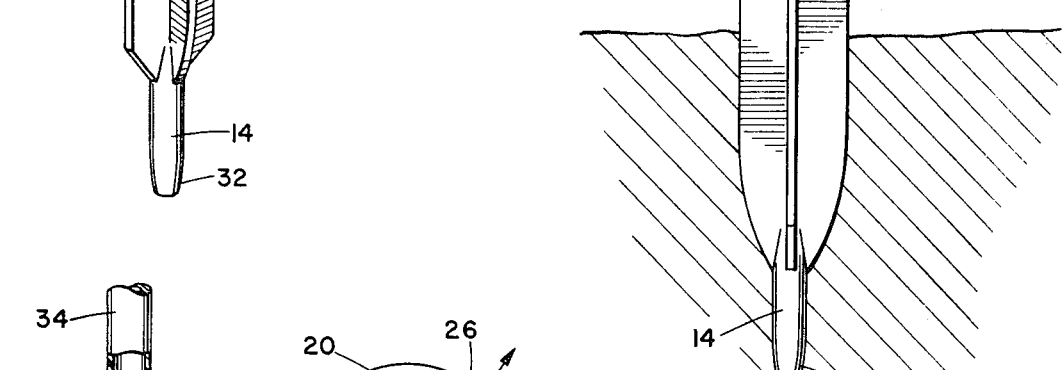
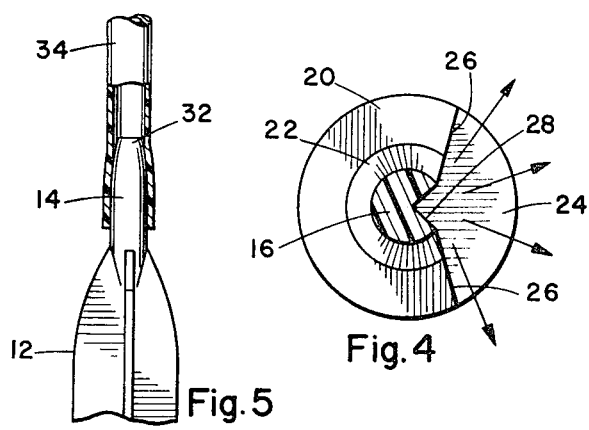
Fig. 1  Fig. 3  Fig. 2  Fig. 4  Fig. 5
INVENTOR.
JAMES C. ROBERTS
BY Brown & Martin
ATTORNEYS

SPRINKLER UNIT

BACKGROUND OF THE INVENTION

Sprinklers that water selected areas in a controlled pattern are usually installed permanently with buried piping. Portable sprinklers usually cover a considerable area, not very evenly, and waste water. In instances where specific small areas or individual plants need to be watered without watering a large surrounding area, particularly where the locations may change when plants are moved, a permanent installation is impractical.

SUMMARY OF THE INVENTION

The sprinkler unit described herein provides a means for temporary irrigation of a small controlled area, and a number of units can be arranged to water selected spots. Each unit is a one-piece peglike element that is simply inserted in the ground at the desired location. The upper end of the unit has a plug that fits tightly into a water supply manifold for a number of sprinkler units. The plug has a restricted channel that directs a jet of water onto a platform incorporated in the upper end of the unit. The platform has angled walls that limit the spread of the water and a fanlike spray to be ejected over the immediate area. The unit is readily movable to any location and, when not in use, can be reversed to close the supply hose by means of a solid plug on the ground penetrating end of the unit.

The primary object of this invention, therefore, is to provide a new and improved sprinkler unit.

Another object of this invention is to provide a new and improved sprinkler unit which is plugged into a supply hose and inserted in the ground at a selected location.

A further object of this invention is to provide a new and improved sprinkler unit which ejects a controlled spray generally horizontal in a fan-shaped pattern.

Another object of this invention is to provide a new and improved sprinkler unit which can be used in multiple with a water supply manifold having a hose for each unit, the individual units being reversible to shut off flow at locations where watering is not needed.

Other objects and many advantages of this invention will become more apparent upon a reading of the following detailed description and an examination of the drawing, wherein like reference numerals designate like parts throughout and in which:

FIG. 1 is a perspective view of the unit.

FIG. 2 is a side elevation view, partially cut away, showing the unit connected to a hose in a typical use.

FIG. 3 is an end view as taken from the lower end of FIG. 1.

FIG. 4 is an enlarged sectional view taken on line 4—4 of FIG. 2.

FIG. 5 is a view showing the unit reversed to act as a plug for the hose.

DESCRIPTION OF THE PREFERRED EMBODIMENT

The sprinkler unit 10 has an elongated stem 12, with a lower cylindrical plug 14 and an upper cylindrical plug 16 of similar size. As shown, the stem 12 has cruciform ribs 18 which are for strength only, the exact configuration of the stem not being critical.

At the upper end of the stem 12 is a disc-shaped cap 20 from which plug 16 projects axially, the plug having a conical flared base portion 22 at its junction with the cap for rigidity. A portion of cap 20 is recessed to provide a flat platform 24 opening to the side of the cap, the platform having angled sidewalls 26 which converge toward plug 16. The walls 26 are shown with an inclined angle of about 150°, but other angles could be used for a specific spread or fan pattern. In the plug 16 is a longitudinal channel or groove 28, shown as being V-shaped in cross section, the groove extending the full length of the plug, through the base portion 22 and terminating at platform 24. The upper tip of plug 16 has a slight taper 30 and the tip of plug 14 has a similar taper 32, to facilitate insertion into a hose. The unit is particularly adaptable to manufacture by molding in one piece from plastic material at low cost.

In use, the unit is connected to a water supply by inserting plug 16 into a close-fitting flexible hose 34, which extends from a supply pipe 36. For an installation using a number of sprinkler units, the supply pipe 36 would be one outlet from a manifold, not shown, to conduct water to all of the units. Flexible hose 34 can be of any reasonable length to allow freedom of positioning of each unit. The plug 14 is pressed into the ground at the desired location, as in FIG. 2, the stem 12 being forced down sufficiently to support the unit. With the water turned on, the restricted groove 28 causes a jet of water to be directed downwardly against platform 24, which breaks up the water into a spray or fine droplets. The platform, bounded by walls 26, directs the spray outwardly in a fan pattern, as indicated by directional arrows in FIGS. 2 and 4.

By this means it is possible to water selected individual plants without wasting water on the surrounding area. Since the units are so easily placed and the spray is directionally controlled, it is a simple matter to move units while a system is in operation. In a multiple-unit system in which not all units need to be in operation, the units not required are merely pulled out of their respective hoses and reversed. The solid plug 14 is inserted tightly into hose 34, as in FIG. 5, effectively shutting off the water at that position. With a hose of suitable plastic material such as PVC, it has been found that this arrangement will hold against normal water pressure.

Having described my invention, I now claim:

1. A sprinkler unit, comprising:
   an elongated ground penetrating stem having a cap at the upper end thereof;
   a substantially cylindrical plug projecting longitudinally from said cap for insertion into a water supply hose;
   said cap having a platform opening to the side thereof;
   and said plug having a longitudinal water conducting groove terminating at said platform.

2. A sprinkler unit according to claim 1, wherein said platform has side walls diverging from said groove.

3. A sprinkler unit according to claim 1, wherein said plug has a tapered tip portion and a flared base portion at the junction with said cap.

4. A sprinkler unit according to claim 1, wherein said stem has a substantially cylindrical solid plug, similar in size to said grooved plug, and extending from the opposite end thereof.

5. A sprinkler unit according to claim 1, wherein said plug has a flared base portion at the junction with said cap, said platform having side walls diverging from said groove;
   and the end of said stem remote from said cap having a longitudinally extending, substantially cylindrical solid plug similar in size to said grooved plug.

* * * * *